United States Patent [19]
Rebalski

[11] Patent Number: 6,138,201
[45] Date of Patent: Oct. 24, 2000

[54] REDUNDANT ARRAY OF INEXPENSIVE TAPE DRIVES USING DATA COMPRESSION AND DATA ALLOCATION RATIOS

[75] Inventor: Jan F. Rebalski, San Francisco, Calif.

[73] Assignees: Sony Corporation, Tokyo, Japan; Sony Electronics Inc., Park Ridge, N.J.

[21] Appl. No.: 09/060,943

[22] Filed: Apr. 15, 1998

[51] Int. Cl.[7] .................................................. G06F 9/26
[52] U.S. Cl. .............................. 711/4; 711/111; 711/162
[58] Field of Search ................................... 711/100, 162, 711/161, 156, 111, 167, 170, 171, 173, 147, 154, 112, 117; 712/31

[56] References Cited

U.S. PATENT DOCUMENTS

| | | | |
|---|---|---|---|
| 5,463,603 | 10/1995 | Petersen | 369/48 |
| 5,613,082 | 3/1997 | Brewer et al. | 711/4 |
| 5,671,389 | 9/1997 | Saliba | 711/111 |
| 5,737,639 | 4/1998 | Ohmori . | |
| 5,802,547 | 9/1998 | Legvold | 711/100 |
| 5,859,990 | 1/1999 | Yarch | 395/311 |
| 5,911,150 | 6/1999 | Peterson et al. | 711/162 |
| 5,940,238 | 8/1999 | Nayak et al. | 360/76 |

*Primary Examiner*—John W. Cabeca
*Assistant Examiner*—Fred F. Tzeng
*Attorney, Agent, or Firm*—Philip M. Shaw, Jr.; Crosby, Heafey, Roach & May

[57] ABSTRACT

A redundant array of inexpensive tape (RAIT) drives wherein a master tape unit controls a plurality of slave tape units by monitoring their servo and buffer status and sending sync commands, all via data appended to user data sent over a peripheral interface bus interconnecting the master tape unit, the slave tape units, and the host computer. The master tape unit allocates user data received from the host computer between the master tape unit and the slave tape units and controls the slave tape units so that the same length of tape media is processed by the master tape unit and each slave tape unit within the same predetermined period of time.

12 Claims, 3 Drawing Sheets

REDUNDANT ARRAY OF INEXPENSIVE TAPE DRIVES USING DATA COMPRESSION AND DATA ALLOCATION RATIOS

Background of the Invention

1. Field of the Invention

This invention relates to mass data storage and retrieval and, in particular, mass data storage in a Redundant Array of Inexpensive Tape drives (RAIT) wherein a master tape drive controls a plurality of slave tape drives.

2. Related Art

Among the types of mass data storage devices are arrays of tape drives. Typically such tape arrays inherently suffer from synchronization problems. The lack of synchronization causes severe degradation of data throughput for such arrays. In addition to extending backup times, spurious, array-induced tape repositioning decreases the capacity of the array. The overall result is a drastically lower performance than expected. While disk drive arrays enjoy proportional increase in throughput and capacity in respect to the number of drives present in the array, tape RAIT systems often perform at a fraction of their theoretical potential. Tape repositioning can be caused by a number of problems, including the loss of streaming operation due to different data compression ratios experienced by individual units within an array, different media characteristics in each array unit (i.e. different incidence of error rates and error severity), and different head contamination levels and mechanical alignment/calibration for each array unit (i.e. different incidence of error rates again).

Media access errors often result in the so called Read After Write (RAW) error recovery operation, where a device re-writes the same information repeatedly until a successful write is accomplished. This extends both the time of the write operation and the amount of media used to store the given amount of information. In an array, a drive conducting a Read After Write operation will likely induce repositioning behavior in the remaining drives within the array. Media access errors during read operations may cause the drive to attempt to re-read the information, which is accomplished by repetitive reposition/read cycles. The detrimental effect on the array is similar to the RAW side-effects. Reading media which contain RAW frames disproportionately extends the read operation for the specific unit which encounters such frames, which again causes the synchronization among tape drives in an array to be lost.

Host induced repositioning due to falling source data rates triggers repositioning, which is likely unsynchronized among drives (they start and complete repositioning cycles at different times), thus causing artificial throughput degradation on top of already lower rates.

Additionally, a number of other factors compound the synchronization problems. Repositioning action by a tape drive has a "ripple effect" on the array as a whole: a single drive blocks the sustained data transfer to the array and causes remaining drives to reposition as well. Since the effect is "cascaded" over time, the drive that finishes repositioning may yet enter another repositioning cycle while waiting for the other drives to finish their repositioning. In the worst cases, the array may not recover from this behavior for a long time, if at all.

Also, repositioning characteristics are unit-specific; this means that individual drives will likely require different amounts of time to perform repositioning cycles. Repositioning cycles also differ in duration within the same unit. Consequently, repositioning is largely unpredictable, and even though average times can be assessed, average performance levels carry no practical implications for the dynamic requirements of high-speed arrays.

The "cascading" effect described above can further be worsened by individual units unable to catch up with the remaining drives in the array. In the worst case, the array may not stream altogether despite the fact that the host is supplying data at the rate sufficient to support streaming operation.

As seen from these observations, the recovery from multi-drive repositioning phenomena is difficult, time-consuming, inefficient, and not always certain. The current, and not very successful, attempts at making tape arrays perform acceptably are: (1) increasing on-board buffer capacities in tape drives; (2) turning data compression off, (3) placing artificial caps on maximum compression ratios (which is done by writing blank areas on tape, thus severely limiting the capacity); (4) aborting backup sessions when media does not perform at the highest levels, and restarting the sessions with new media. As it can easily be surmised, these solutions are far from optimal, and are at best jury-rig attempts at making tape arrays marketable at all. The general outcome is that tape arrays are uncommon in the marketplace and the customer satisfaction levels are disappointing.

SUMMARY OF THE INVENTION

A first object of the invention is to prevent repositioning by maintaining the array in a streaming operation. A second object of the invention is the provision of synchronized repositioning among drives within an array in order to improve the array's recovery in non-streaming circumstances. These objectives call for some manner of achieving synchronization among units in terms of physical media management and handling.

The first element according to the invention in achieving synchronization is the introduction of "meta-proportional" data distribution among drives by allowing for inter-drive communications of such information as current buffer and media access states. Hereinafter, this is referred to as "RAIT synchronization through data throttling." Unlike in a standard disk drive array, the amounts of user data transferred to each drive is not the same; the system, rather, guarantees that the same amount (length) of media is processed by each drive within the same amount of time, irrespective of local error rates, compression ratios, RAW, or media access retries. This approach improves "streamability" of the system as a whole, as each drive reads and writes the same physical amount of data, while the logical (user) data size may very well differ among the units. Since normal RAIT controllers do not monitor nor are aware of the backend aspects of device operation, they are unable to direct the tape array to accommodate the variable and real-time media handling characteristics of each drive.

The second element according to the invention in achieving synchronization is drive-level RAIT control, wherein one of the tape devices (master unit) of the tape drive array acts as the RAIT master in respect to the other drives (slave units) comprising the array. This eliminates the need for external RAIT controllers and/or for the host to manage the details of RAIT operation. Since the user data amounts differ among the drives within the array, some form of media-based, RAIT oriented format information must be maintained. This format specification can be encapsulated into and defined as AIT/R (Advanced Intelligent Tape/RAIT) in the case of AIT drives. The AIT format specification is Sony Corporation's format for 8 mm tape drives. The access to this information is most immediate to the tape drive acting as the master and having a direct, local access to such information. Consequently, the inter-drive data throttling protocol implementation is simpler and more efficient because the RAIT master is one of the drives.

DETAILED DESCRIPTION OF THE PREFERRED EMBODIMENTS

Figure 1:
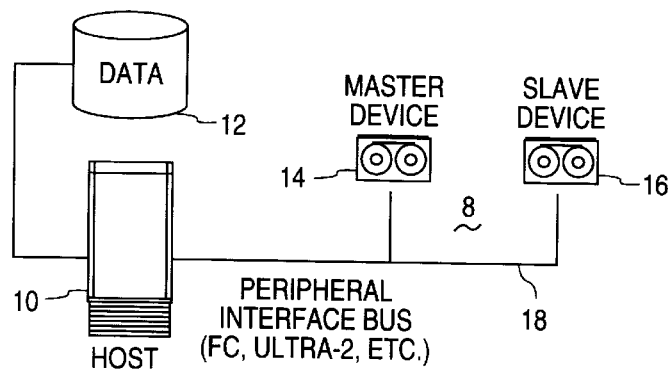
FIG. 1 is a block diagram of a host computer and tape array according to the present invention.

Referring now to FIG. 1, in the RAIT system according to the invention, a host computer 10 writes and reads data with respect to a random access data storage device 12, most typically a magnetic hard disk drive (HDD) as well as an array 8 of tape drives connected together with the host computer 10 via a peripheral interface bus 18. The host computer 10 writes data to the array 8 and reads data from the array 8 generally in a streaming format, that is to say, in a large number of blocks of data at one time. The tape array 8 is comprised of a master device 14 and a plurality of slave devices 16, only one of which is shown for the sake of simplicity.

Figure 3:
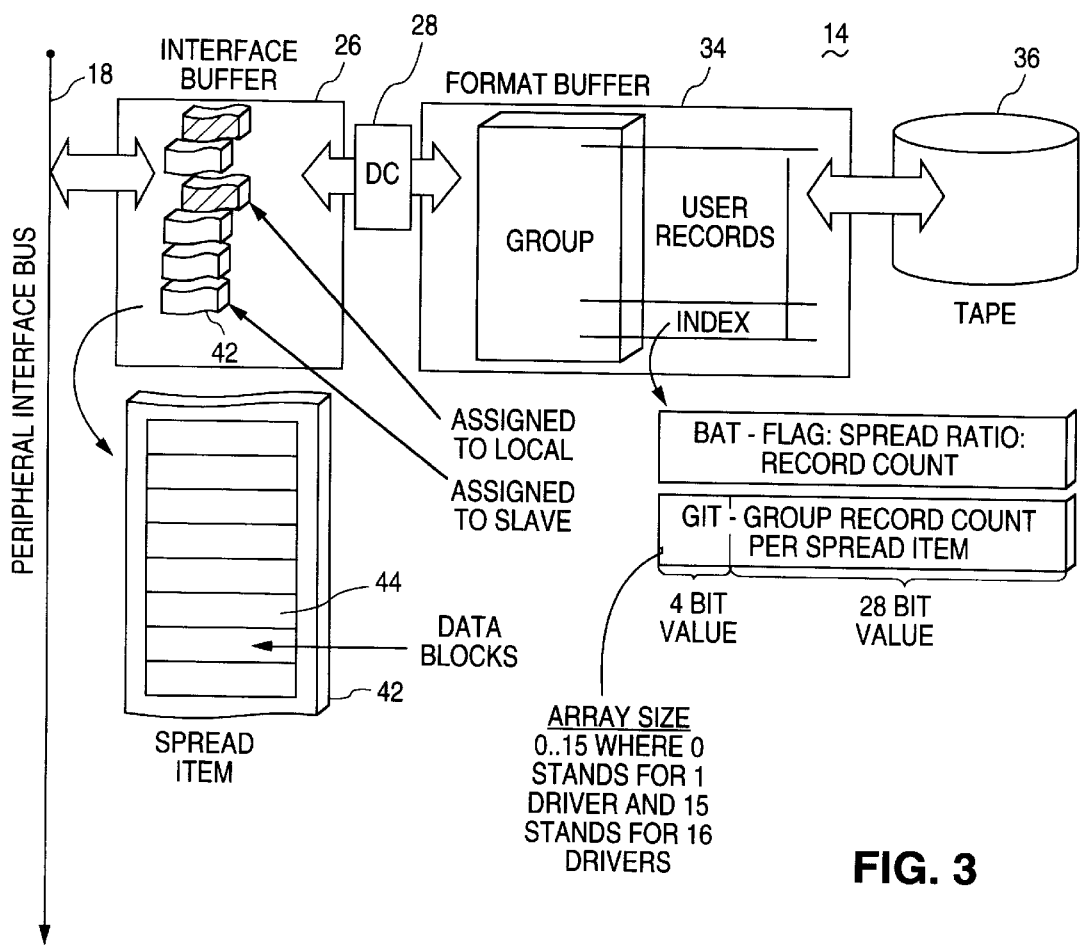
FIG. 3 is a diagram for use in explaining the operation of the master tape unit depicted in FIGS. 1 and 2 and its management of data and formatting.
Figure 2:
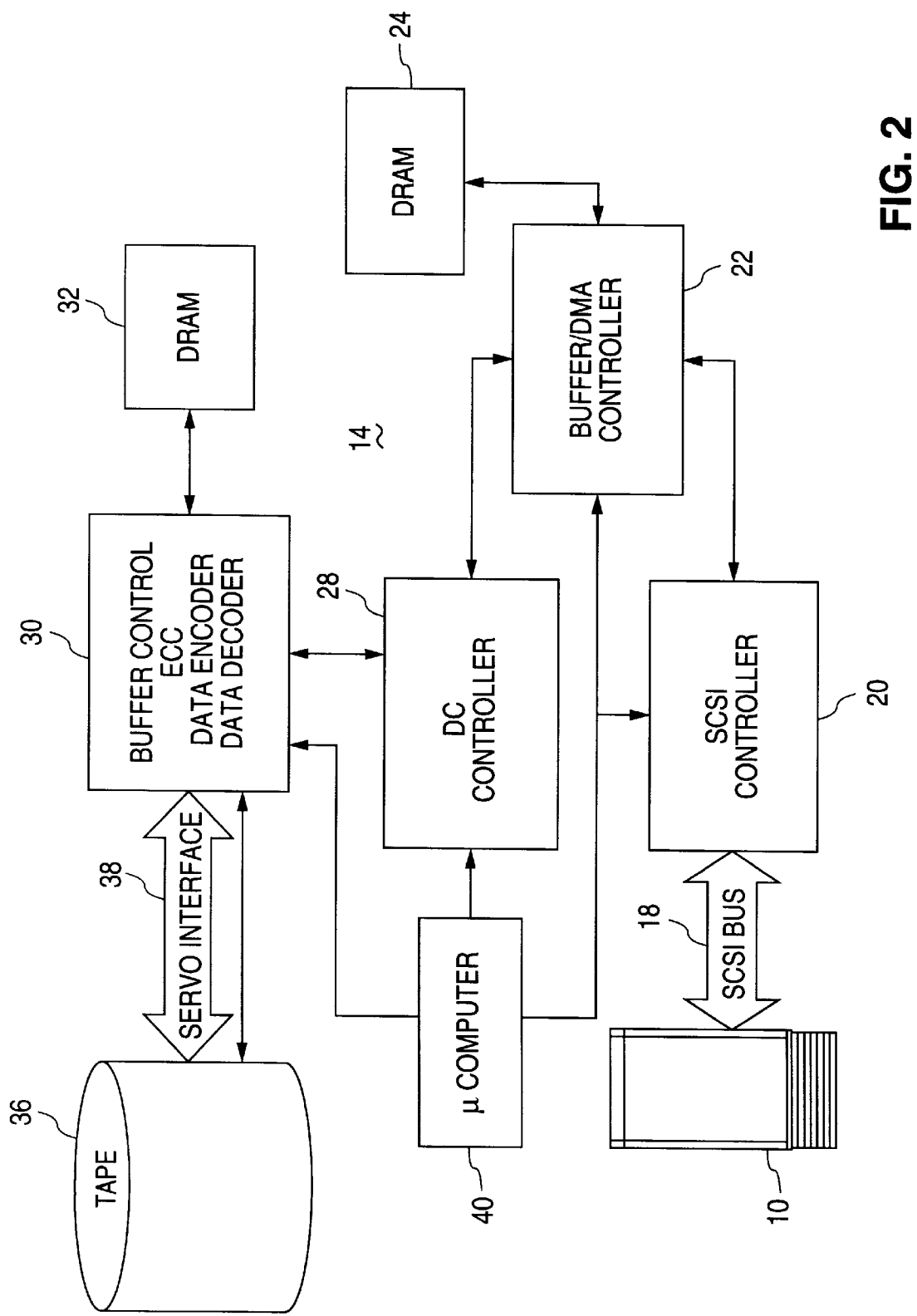
FIG. 2 is a detailed block diagram of the data handling components of the master tape unit depicted in FIG. 1.

As shown in FIG. 2, the master device 14 is comprised of a small computer system interface (SCSI) controller 20 connected to the peripheral bus 18 (which is typically a SCSI bus). The SCSI controller 20 passes data to and from a buffer/DMA (direct memory access) controller 22 which, in a manner to be explained in more detail hereinafter, writes and reads the data to and from a memory, e.g. a DRAM, 24. Later in this description, the units 22 and 24 will be referred to as an interface buffer 26. Data read from the DRAM by the buffer/DMA controller 22 is supplied to a data compression/decompression (DC) controller 28 which can compress or decompress data in any of a variety of known ways suitable for tape storage. From the DC controller 28 the data is supplied to a buffer control, error correction coder/decoder unit 30. Data from unit 30 is stored in and retrieved from a second memory, e.g. a DRAM 32. Later in this description the units 30 and 32 will together be referred to as a format buffer 34. Data read from the DRAM 32 is supplied to a tape unit 36. The tape unit 36 is controlled by firmware via a servo interface 38. All of the units depicted in FIG. 2 operate under the control of a microcomputer 40. The slave devices 16 have a substantially similar construction, but are programmed to operate under the control of the master device 14 which is programmed to control the slave devices 16. The system will now be explained in terms of its operation with reference to FIGS. 3 and 4.

Write Scenario (data flows from host computer 10 to RAIT drives 14, 16)

The host computer 10 sends data only to the tape device 14 acting as the RAIT master. The master device 14 collects the host computer data in its interface buffer 26, divides the data into data chunks called "spread items" 42 and allocates individual spread items 42 for local and slave storage. Each spread item 42 is comprised of a plurality of data blocks 44. Local spread items (shown as shaded in FIGS. 3 and 4) are sent to the format buffer 34 of the master device 14 through the data compression hardware 28. Slave spread items 42 (shown as unshaded in FIG. 2) are sent out from the interface buffer 26 over the interface bus 18 to the slave device 16. The first spread item 42 is always allocated to the master device 14.

The master device 14 and the slave devices 16 format the data somewhat differently. The master device 14 writes additional format information alongside the user data, while a given slave device 16 writes the data using the standard format for the device with the exception of recording a RAIT media set identifier on the media (the identifier may be located in a MIC (multi-interface chip), if the media is so equipped). The master device 14 periodically receives buffer and servo status reports 46 from the slave device 16 and uses this information to properly throttle the slave device 16 by sending it the appropriate amounts of data. The "throttling" action consists of dividing the user data into chunks (the spread items 42) and distributing these between the master device 14 and the slave device 16 in correct proportions. Additionally, synchronization protocol 48, 56 is used between the devices to fine tune the synchronization of the servo operations of both the master device 14 and the slave device 16. As mentioned above, the amounts of user data (spread items 42) transferred to each drive 14 and 16 will not be the same. The master drive 14 is programmed to guarantee that the same amount (length) of media (e.g, tape) is processed by each drive 14, 16 within the same amount of time, irrespective of local error rates, compression ratios, RAW, or media access retries.

Read Scenario (data flows from RAIT drives to host computer 10)

When reading the data, the master device 14 uses the format information to properly gather (in the interface buffer 26) the spread items 42 from storage locations of the master device 14 and the slave devices 16. The data from the slave devices 16 is retrieved over the peripheral interface bus 18 and arrives in the interface buffer 26. The spread items 42 are properly sequenced in the interface buffer 26 and then sent out to the host computer 10 via the peripheral interface bus 18. Synchronization during reads largely relies on the data being originally written at correct spread ratios. Additionally, synchronization protocol is used between the devices to fine tune the synchronization of both master device 14 and slave device 16 servo operations, as will be explained in greater detail hereinafter. The effectiveness of synchronization during reads may suffer if the media has undergone disproportional degradation due to improper storage, heavy use or to some other causes. In environments characterized by heavy read operations, the tape sets may need to be periodically recreated.

Mirroring (write only operation)

During mirroring, the master device 14 re-sends the host computer data to the slave device 16. No special format extensions are used. Synchronization protocol, however, is still needed for efficient operation, except that it does not rely on the data throttling technique.

Device Native Format Extensions (AIT- 2/R)

The additional format information recorded on the tape media by the master device 14 consists of a special Block Allocation Table (BAT) entry called a Spread Ratio & Record Count. It also consists of an additional field in the Group Information Table (GIT) called RAIT information field, and containing the array size sub-field (4-bit value, upper 4 bits), and group record count per spread item sub-field (28 bit value, lower 28 bits) a Group Record Count per Spread Item. A possible location for the RAIT information field is the last four bytes in the standard GIT structure. These bytes are to contain the number of records (data blocks 44) that comprise a single spread item (42). This setting is effective throughout the entire Group, but may be different for different Groups on the same tape. The proposed Flag Byte value for the Spread Ratio & Record Count entry has the lower four bits set to binary 1000, and the most significant bit (MSB) reserved for the customary EWP bit. The second byte of the BAT entry contains the spread ratio information, which is expressed in the following manner:

| spread ratio field value | definition |
| --- | --- |
| 0 | use current ratio (no ratio change) |
| 1 | ratio of 1:1, i.e. the master device 14 and slave devices 16 are allocated the same number of spread items (the spread items are interleaved); the first item belonging to the spread set are written locally by the master device 14. |
| 2 | ratio of 2:1, i.e. master device 14 is allocated two spread items per each spread item allocated to the slave device 16; the first items belonging to the spread set are written locally by the master device 14. |
| −2 | ratio of 1:2, i.e. slave device 16 is allocated two spread items per each spread item allocated to the master device 14; the first items belonging to the spread set are written locally by the master device 14. |

The values can reach the maximum of 127 (which stands for the ratio of 127:1) and the minimum of −127 (which stands for the ratio of 1:127). In order to obtain such ratios as 2:3, the current ratio value may be manipulated over time leveraging the buffer capacities of each device (e.g. the master device 14 may periodically switch between 1:1 and 1:2 ratio to get the average of 2:3 over a certain period of time). The last two bytes of the BAT entry express the record count, which stands for the number of records stored in the Group under a given spread ratio: the third byte is the MSB and the fourth byte is the LSB (least significant bit) of the value.

When the data is first written into a Group, the BAT entry is also written. The first record in the Group which starts in the same Group is associated with the first Spread Ratio & Record Count entry. The master device 14 always allocates the first record effected by the spread ratio locally, i.e. the master device 14 always allocates the first record to itself. All subsequent records written under the same spread ratio are associated with the same BAT entry. When the spread ratio is changed, the record count in the current BAT entry is updated, and a new BAT entry is created showing the new ratio. The first record written under the new spread ratio is associated with the new BAT entry as its first record.

When the spread ratio is maintained across Groups, the first record starting in the Group is associated with the first Spread Ratio & Record Count entry, and that entry has the spread ratio set to zero (0).

Additionally, when the number of records written into the same Group under the same spread ratio exceeds the maximum number expressible with a two byte (16 bit) value, a new BAT entry is written with the spread ratio set to zero (0).

Finally, writing filemark and setmark BAT entries makes it necessary to write a new Spread Ratio & Record Count entry. Filemarks and setmarks are recorded exclusively on the master device 14 drive. Spacing to filemarks and setmarks is to be performed by the master device 14 and slave device 16 in a synchronized manner, in which the master device 14 directly manages the servo operation of the slave device 16.

Synchronization Protocol

Figure 4:
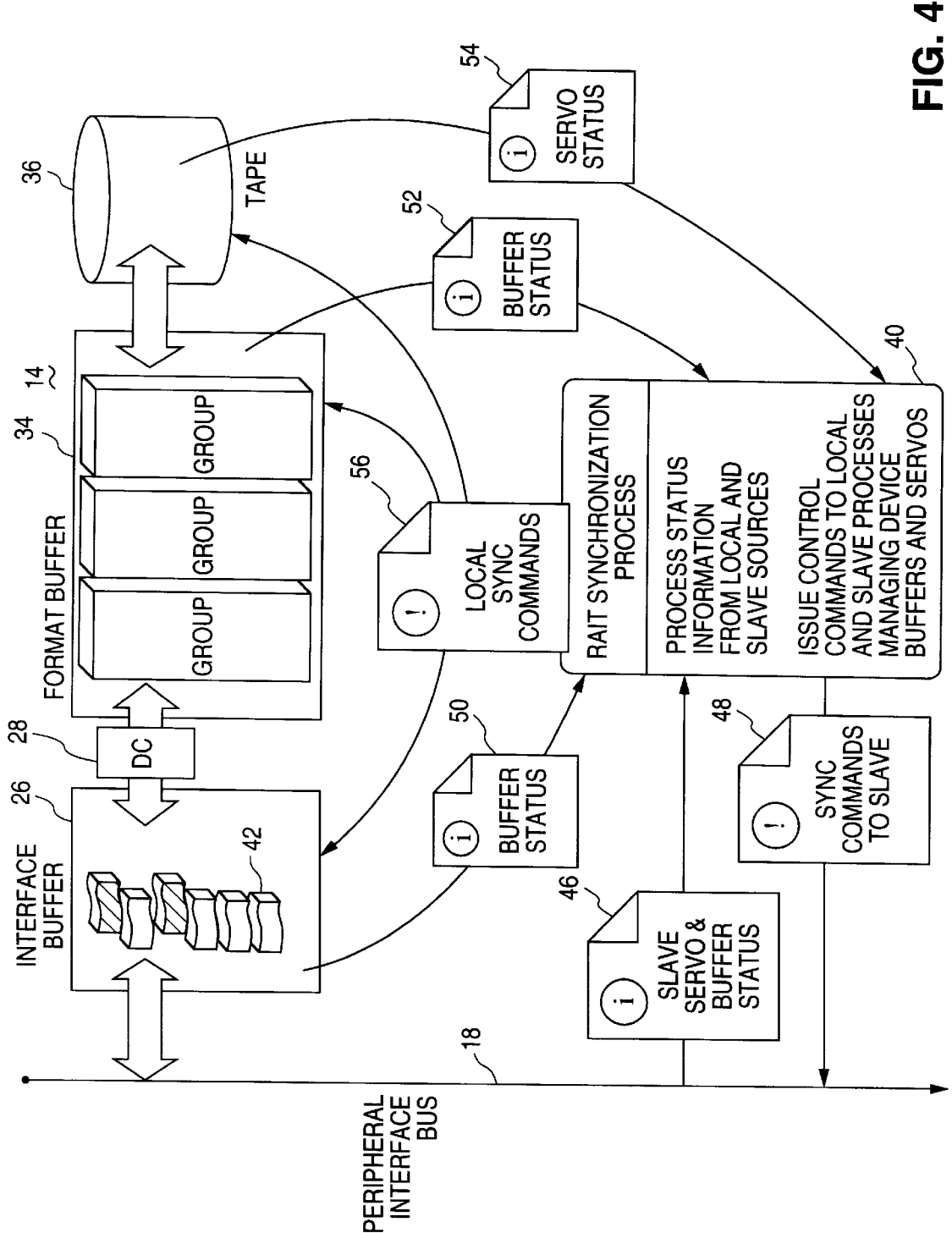
FIG. 4 is a diagram for use in explaining the control operations of the master tape unit depicted in FIGS. 2 and 3.

Referring now particularly to FIG. 4, the synchronization protocol is largely based on the existing industry standard SCSI Enclosure Commands, specifically on the Send Diagnostic and Read Diagnostic commands. The slave status information 46 encapsulated by this protocol and transmitted via the peripheral interface bus 18 contains the real-time slave servo states and the slave interface buffer and format buffer states of slave devices 16. This slave status information 46 is used by the master device 14 to control RAIT operations on the bus 18. Additionally, the protocol contains sync commands 48 sent by the master device 14 to the slave devices 16. These sync commands 48 permit close control of the slave device's backend operations (e.g. the start of a physical servo write after a repositioning stop). Furthermore, the master tape unit 14 is also monitoring the statuses 50, 52 of its interface buffer 26 and format buffer 34, respectively, its tape drive servo status 54, and issuing local sync commands 56 to the interface buffer 26, the format buffer 34, and the tape drive 36. This synchronization process is managed by the microcomputer 40.

The benefits of the system according to the invention are a significant reduction of repositioning frequency in tape arrays, rapid recovery from repositioning when it does occur, a resulting increase in effective data throughput and capacity for the array, and a resulting reduction in wear and tear of drive assembly and media. Additional benefits are a resulting increase in array responsiveness to host activity, which promotes even greater operational efficiency by helping the host system in its efforts to supply large amounts of data in a very short time, as is typical of high performance, high-end systems and a decrease in host internal overhead by the removal of the necessity for RAIT management at the host level. This enhances the operation of the system as a whole, as well as make it more likely for the host to maintain very high I/O rates with the array subsystem.

Still further benefits include a reduction in array costs through the elimination of the need for a separate, and expensive, RAID controller and the ease of configuring a series of tape drives as an array on the same bus is exceptional, requiring only that a single drive be directed to act as a RAIT master for other tape drives (slave drives) on the bus. Subsequently, the array is self-configuring and self-managing. Ala carte mirroring or stripping operational choices can be provided with ease to end users. Larger; multi-bus arrays can be formulated using specialized, super-performance RAIT controllers. This may be suitable for enterprise systems.

Although the present invention has been shown and described with respect to preferred embodiments, various changes and modifications are deemed to lie within the spirit and scope of the invention as claimed.

What is claimed is:

1. A redundant array of tape drives for storing user data, comprising:

a master tape unit;

a plurality of slave tape units;

a bus coupled to the master tape unit and the slave tape units; wherein the slave tape units are each configured to generate status information and to send the status information along the bus to the master tape unit;

the master tape unit is configured to receive the status information, to control the slave tape units, to divide the user data into a plurality of spread items, and to allocate the spread items for storage by the master tape unit and by the slave tape units so that the same length of tape media is processed by the master tape unit and each slave tape unit within the same period of time; and the master tape unit is further configured to record the spread item allocated to the master tape unit and to record information regarding the division of the user data into the spread items.

2. A redundant array of tape drives for storing data supplied from a host computer, according to claim 1, wherein the status information includes information regarding one or more of slave servo status, slave buffer status, and slave servo synchronization commands.

3. A redundant array of tape drives for storing data supplied from a host computer, according to claim 1, wherein:

a master format buffer reformats groups of user data played back by the master tape drive into spread items and supplies these spread items to a master interface buffer; and the master interface buffer receives, via the peripheral interface bus, spread items played back by the slave tape units and, using the appended additional information, reassembles the arrangement of spread items as it existed before allocation and outputs the user data from the spread items to the host computer via the bus.

4. A redundant array of tape drives for storing data supplied from a host computer, according to claim 1, wherein each slave tape unit comprises:

a slave tape drive for recording and playing back user data;

a slave interface buffer connected to the bus for receiving spread items from the master tape unit and sending spread items to the master tape unit; and a slave format buffer connected to the slave interface buffer for formatting the data blocks of the spread items received from the slave interface buffer according to a predetermined format to produce groups of user data and supplying the groups of user data to the slave tape drive for recording.

5. A redundant array of tape drives for storing data supplied from a host computer, according to claim 4, wherein:

the slave format buffer also reformats groups of user data played back by the slave tape drive into spread items and supplies these spread items to the slave interface buffer; and the slave interface buffer receives the played back spread items and outputs the spread items to the master tape unit via the peripheral interface bus.

6. A redundant array of tape drives for storing data supplied from a host computer, according to claim 4, further comprising slave data compression and decompression means interposed between the slave interface buffer and the slave format buffer for compressing the data blocks supplied from the slave interface buffer and outputting the compressed data blocks to the slave format buffer.

7. A redundant array of tape drives for storing data supplied from a host computer, comprising:

a master tape unit;

a plurality of slave tape units;

a peripheral interface bus for connecting the master tape unit, the slave tape units, and the host computer together, wherein the slave tape units each include means for generating status information and sending such status information along the peripheral interface bus to the master tape unit; and the master tape unit, supplied with the status information, controls the slave tape units so that the same length of tape media is processed by the master tape unit and each slave tape unit within the same predetermined period of time; wherein the master tape unit comprises:

a master tape drive for recording and playing back user data;

a master interface buffer connected to the peripheral interface bus for dividing user data received from a host computer into an arrangement of spread items, each spread item being comprised of a plurality of data blocks, and, using the status information, allocating individual spread items for storage by the master tape unit and the slave tape units so that the same length of tape media is processed by the master tape unit and each slave tape unit within the same predetermined period of time; and a master format buffer connected to the master interface buffer and the master tape drive for formatting the data blocks of the spread items received from the master interface buffer according to a predetermined format into groups of user data and appending to each group of user data additional information regarding the division of the user data into spread items by the master interface buffer, and supplying the groups of user data to the master tape drive for recording; and wherein the additional information appended to the groups of user data by the master format buffer includes a ratio ("spread ratio") of the number of spread items allocated to the master tape unit versus the number of spread items allocated to the slave tape units.

8. A redundant array of tape drives for storing data supplied from a host computer, according to claim 7, wherein the additional information appended to the groups of user data by the master format buffer includes a group record count per spread item representing the number of data blocks per spread item for a given group of spread items all allocated according to the same spread ratio.

9. A redundant array of tape drives for storing data supplied from a host computer, according to claim 8, wherein the additional information appended to the groups of user data by the master format buffer includes a record count representing the number of spread items in the given group of spread items all allocated according to the same spread ratio.

10. A redundant array of tape drives for storing data supplied from a host computer, according to claim 9, wherein the spread ratio and the record count are written in a block allocation table (BAT) entry in a group of user data and the group record count per spread item is written as an entry in a group information table (GIT) of the group of user data.

11. A redundant array of tape drives for storing data supplied from a host computer, comprising:

a master tape unit;

a plurality of slave tape units;

a peripheral interface bus for connecting the master tape unit, the slave tape units, and the host computer together, wherein the slave tape units each include means for generating status information and sending such status information along the peripheral interface bus to the master tape unit; and the master tape unit, supplied with the status information, controls the slave tape units so that the same length of tape media is processed by the master tape unit and each slave tape unit within the same predetermined period of time; wherein the master tape unit comprises:

a master tape drive for recording and playing back user data;

a master interface buffer connected to the peripheral interface bus for dividing user data received from a host computer into an arrangement of spread items, each spread item being comprised of a plurality of data blocks, and, using the status information, allocating individual spread items for storage by the master tape unit and the slave tape units so that the same length of tape media is processed by the master tape unit and each slave tape unit within the same predetermined period of time;

a master format buffer connected to the master interface buffer and the master tape drive for formatting the data blocks of the spread items received from the master interface buffer according to a predetermined format into groups of user data and appending to each group of user data additional information regarding the division of the user data into spread items by the master interface buffer, and supplying the groups of user data to the master tape drive for recording; and master data compression and decompression means interposed between the master interface buffer and the master format buffer for compressing the data blocks supplied from the master interface buffer and outputting the compressed data blocks to the master format buffer.

12. A redundant array of tape drives for storing user data, comprising:

a master tape unit means;

a plurality of slave tape unit means;

a bus means for coupling the master tape unit means and the slave tape unit means:

wherein each slave tape unit means comprises means for generating status information and for sending the status information along the bus means to the master tape unit means;

wherein the master tape unit means comprises means for receiving the status information, for dividing the user data into a plurality of spread items, and for allocating the spread items for storage by the master tape unit means and the slave tape unit means, so that the same length of tape media is processed by the master tape unit means and each slave tape unit means within the same period of time; and the master tape unit means further comprises means for recording the spread item allocated to the master tape unit and for recording information regarding the division of the user data into the spread items.

* * * * *